US006978334B2

(12) United States Patent
Hiratsuka (10) Patent No.: US 6,978,334 B2
(45) Date of Patent: Dec. 20, 2005

(54) SERIAL BUS DATA CONTROL DEVICE (75) Inventor: Shinji Hiratsuka, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 444 days.

(21) Appl. No.: 09/817,136

(22) Filed: Mar. 27, 2001

(65) Prior Publication Data

US 2004/0225810 A1 Nov. 11, 2004

(30) Foreign Application Priority Data

Dec. 6, 2000 (JP) ........................................ 2000-175013

(51) Int. Cl.[7] .............................................. G06F 13/14
(52) U.S. Cl. ........................ 710/305; 710/310; 710/313
(58) Field of Search ................................ 710/310, 311, 710/313, 52, 100, 107, 108, 305; 370/498, 438, 235, 428, 393

(56) References Cited

U.S. PATENT DOCUMENTS 6,304,553 B1 * 10/2001 Gehman et al. ............ 370/235
6,347,097 B1 * 2/2002 Deng ......................... 370/498
6,363,428 B1 * 3/2002 Chou et al. ................. 709/232
6,513,085 B1 * 1/2003 Gugel et al. ................ 710/305
6,513,087 B1 * 1/2003 Arima ........................ 710/305

FOREIGN PATENT DOCUMENTS

JP          10-222440          8/1998

* cited by examiner

Primary Examiner—Khanh Dang
(74) Attorney, Agent, or Firm—Rabin & Berdo, P.C.

(57) ABSTRACT

A serial bus data control device for communication devices to receive data in a packet format is provided which is capable of obtaining each piece of actual data contained in each of packets needed for reconstructing a series of original data by storing actual data contained in two or more received packets in a memory location with a continued address in a buffer. The serial bus data control device includes a preprocessing section to recognize each of the packets received through the serial bus and to divide the actual data contained in each of the packets into a plurality of unit length data portions having a predetermined length, and a storing section to store the actual data portions contained in each of the packets recognized by the preprocessing section. The preprocessing section has an address control circuit to perform addressing to store each of the unit length data constituting the actual data contained in each of the packets.

32 Claims, 6 Drawing Sheets

HEADER 1

ACTUAL DATA 1

FOOTER 1

HEADER 2

ACTUAL DATA 2

FOOTER 2

HEADER 3

ACTUAL DATA 3

FOOTER 3

PRIOR ART

SERIAL BUS DATA CONTROL DEVICE

BACKGROUND OF THE INVENTION

1. Field of the Invention

The present invention relates to a serial bus data control device used for a serial bus such as a well-known IEEE 1394 serial bus (hereinafter referred to as an "IEEE 1394 bus") which is mounted, for example, on computers and/or peripheral equipment adapted to control sending and receiving of data transferred through the serial bus between the computer and peripheral equipment and more particularly to the serial bus data control device capable of performing more efficient processing of received data.

2. Description of the Related Art

Figure 6:
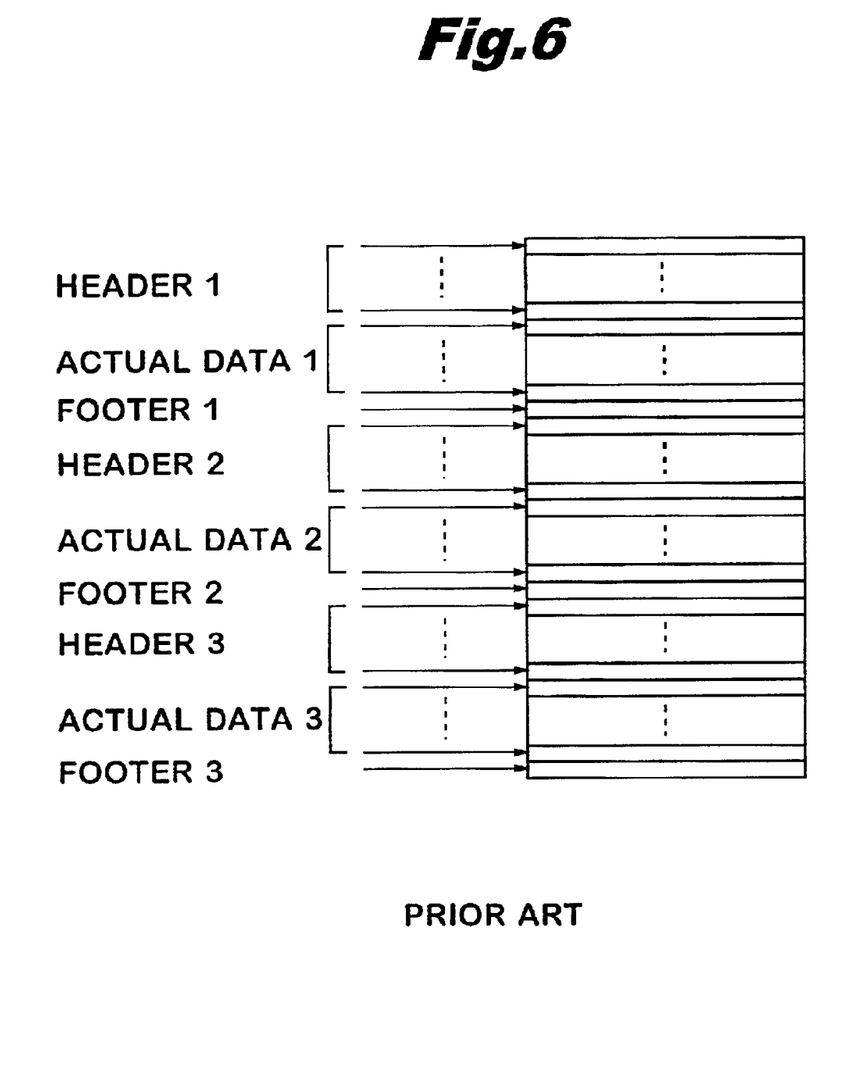
FIG. 6 is a diagram illustrating arrangements of data in a buffer provided to a conventional serial bus data control device.

When a series of data representing a certain kind of information is transferred through the IEEE 1394 bus between a computer and a peripheral equipment, each being equipped with a serial bus data control device for the bus, a plurality of packets containing divided data each having an individually predetermined length of data is received and sent between the computer and the peripheral equipment. Each of the packets is composed of a header constituting a head portion of each packet, actual data i.e., divided data having an individually predetermined length and a footer constituting a tail portion of the packet. Conventionally, when a packet as described above is sequentially transferred through the IEEE 1394 bus from a sending device, i.e., a sending node to a receiving device. i.e., a receiving node, the data contained in each of the packets is stored temporarily in a buffer mounted in a serial bus data control device of the receiving node. As shown in FIG. 6, in a buffer of a conventional serial bus data control device, after a header, actual data and a footer contained in a packet 1 received first are stored in the buffer in order of addressed memory locations, a subsequently received packet 2 is stored after the footer of the packet 1. Then, a subsequently received packet 3 is sequentially stored after the footer of the packet 2. The receiving node, to reconstruct a series of original data from two or more received packets, then extracts only actual data from each of the packets stored in the buffer by selecting an address assigned to the actual data and by reading the actual data having the selected address from the buffer in order.

However, as described above, in the receiving node having such a conventional serial bus data control device, to reconstruct original data from two or more received packets, it is necessary to select and read only actual data positioned between a header and a footer, that is, divided by the header and the footer, out of the header, actual data and footer contained in each of the packets stored in the buffer. Therefore, processing of data contained in each of the received packets on the receiver node side becomes very complicated, thus making it difficult to achieve a prompt and speedy reconstruction of data.

SUMMARY OF THE INVENTION

In view of the above, it is an object of the present invention to provide a serial bus data control device capable of obtaining each piece of actual data contained in each of the packets needed for reconstructing a series of original data by storing actual data contained in two or more received packets in a memory location in a manner such that each piece of the actual data has a continued address in a buffer.

According to a first aspect of the present invention, there is provided a serial bus data control device for being provided to communication equipment to receive two or more packets each being sent through a serial bus and each being composed of a header, actual data positioned subsequently to said header and a footer positioned subsequently to the actual data including:

a preprocessing section to recognize each of the two or more packets received through the serial bus and to divide at least the actual data contained in each of the recognized packets into two or more pieces of unit length data each having a predetermined data length; and a storing section to temporarily store at least the actual data contained in each of said packets recognized by the preprocessing section;

whereby the preprocessing section is provided with an address control circuit to assign a continued address of the storing section, at least, to said unit length data constituting the actual data contained in each of the recognized packets composed of the header, actual data and footer.

In the foregoing, a preferable mode is one wherein the header contained in each of the packets has information about nodes on a sender side and on a receiver side and wherein a length of data of the header, actual data and footer is an integral multiple of a storing unit in the storing section.

Also, a preferable mode is one wherein the address control circuit performs addressing to store the header and footer, in addition to addressing to store the actual data and is provided with an address signal generating section to generate an address signal used to assign an address of the storing section to the header, actual data and footer, with an increment signal generating section to generate an increment signal used to sequentially add the address signal generated by the address signal generating section and to feed the generated increment signal to the address signal generating section and with a decrement signal generating section used to generate a decrement signal used to sequentially subtract the address signal to be generated by the address signal generating section and to feed the generated decrement signal to the address signal generating section and wherein, when an address is assigned to the header, a supply of the increment signal generated by the increment signal generating section and the decrement signal generated by the decrement signal generating section to the address signal generating section is stopped and, when an address is assigned to the unit length data constituting the actual data, the increment signal is fed from the increment signal generating section sequentially to add the address signal and, when an address is assigned to the footer, after the increment signal has been fed from the increment signal generating section to add the address signal for temporarily storing the footer in the storing section, the decrement signal generated by the decrement signal generating section is fed to the address signal generating section to subtract the address signal to be given to the footer for causing the footer to be overwritten by a header contained in a subsequently receiving packet.

Also, a preferable mode is one wherein the header is composed of two or more pieces of unit length data each having a unit length and wherein, when an address is assigned to each of the unit length data contained in the header, by stopping a supply of the increment signal and the decrement signal to the address signal generating section to sequentially overwrite the unit length data contained in the header, the same address is assigned to the unit length data contained in the header.

Also, a preferable mode is one wherein, when an address is assigned to the unit length data contained in the actual data, a head address signal used to assign an address to unit length data placed in a head position in said two or more pieces of unit length data contained in the actual data matches an address signal for the header.

Also, a preferable mode is one wherein the footer is composed of two or more pieces of unit length data each having a unit length and wherein, after addressing has been performed by the address signal generating section to store each piece of the unit length data contained in the footer in the storing section, subtraction is done to match an address of the unit length data placed in a head position in the footer with that of a unit length data placed in a head position in a header contained in a subsequently receiving packet for causing the footer to be overwritten by the subsequent packet.

Also, a preferable mode is one wherein the storing section has a first data area to store the headers and footers contained in two or more packets in a manner so as to be arranged in a continuous state and a second data area to store two or more pieces of actual data contained in the two or more packets in a manner so as to be arranged in a continuous state.

Also, a preferable mode is one wherein each of the first data area and the second data area is composed of a single area.

Also, a preferable mode is one wherein the address control circuit performs addressing to store the header and the footer in addition to the addressing to store the actual data and is provided with a first address signal generating section to generate an address signal for assigning an address of the first data area to the header and the footer, with a second address signal generating section to generate an address signal for assigning an address of the second data area to the unit length data contained in the actual data, with an increment instruction signal generating section to generate a first increment instruction signal for sequentially adding the address signals produced by the first address signal generating section and a second increment instruction signal for sequentially adding the address signals produced by the second address signal generating section and to selectively feed the first and second increment instruction signals to the first and second address signal generating section and with a switching section to operate in accordance with the first and second increment instruction signals to feed selectively either of both the address signals produced by the first and second address generating sections to the storing section and wherein the increment instruction signal generating section, when an address is assigned to the header and said footer, sends out the first increment instruction signal to the first address generating section and, when an address is assigned to the actual data, sends out the second increment instruction signal to the second address generating section.

Also, a preferable mode is one wherein the switching section connects the first and second address signal generating sections selectively to the storing section in accordance with the first increment instruction signal fed from the increment instruction signal generating section to feed the address signal to the storing section.

Also, a preferable mode is one wherein the increment instruction signal generating section is provided with a register to supply a signal expressing a value of the header, actual data and footer, with a first and second counters to count the value expressed by the signal fed from the register, with a first gate being operated in accordance with an output signal from each of the counters to send out the first increment instruction signal at the time of addressing to store the header and the footer and with a second gate being operated in accordance with an output signal from each of the counters to send out the second increment instruction signal at the time of addressing to store the actual data.

Also, a preferable mode is one wherein the second gate, when the first gate receives simultaneously a gate signal from the first counter and a gate signal from the second counter, receives simultaneously a first signal being complementary to the gate signal from the first counter and a second signal being complementary to the gate signal from the second counter.

Also, a preferable mode is one wherein each of the both areas in the storing section is partitioned to divided sections to correspond to each of the nodes so that each of packets received from two or more nodes through the serial bus is stored.

Also, a preferable mode is one wherein each of the first and second data areas is composed of a single area.

Also, a preferable mode is one wherein the preprocessing section is provided to the address control circuits each corresponding to each of the nodes and with a node switching section to selectively supply an address signal fed from the address control circuits provided to correspond to each of the nodes to the storing section.

Also, a preferable mode is one wherein a storing capacity of each of the divided sections in said both data areas of the storing section is variable.

Also, a preferable mode is one wherein the storing capacity of each of the divided sections in the both data areas is able to be adjusted depending on a total amount of data of the header and the footer contained in each of two or more packets sent from each of the nodes and on a total amount of data of the actual data contained in each of two or more packets sent from each of the nodes.

Furthermore, a preferable mode is one wherein each of the address control circuits corresponding to each of the nodes is provided with a first address register and a second address register to store an address showing a head portion of each of the divided sections and an address showing a tail portion of each of the divided sections for specifying each of the divided sections in each of the first and second data areas and wherein both the addresses assigned to the header and the footer to store in each of the divided sections are stored in the first address register and both the addresses assigned to the actual data to store in each of the divided sections are stored in the second address register.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

First Embodiment

Figure 1:
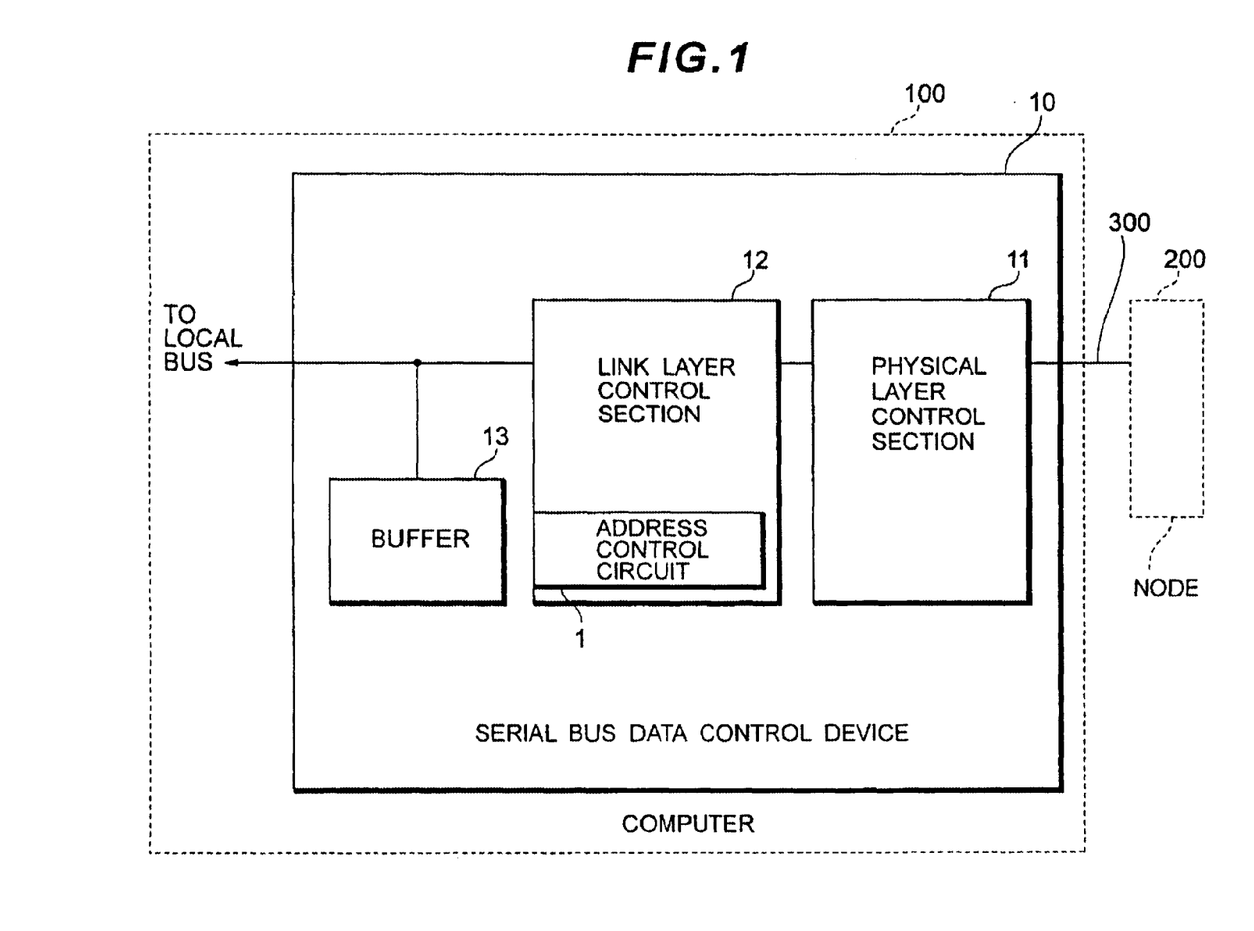
FIG. 1 is a schematic block diagram showing configurations of a serial bus data control device according to a first embodiment of the present invention.

FIG. 1 is a schematic block diagram showing the configurations of a serial bus data control device 10 according to a first embodiment of the present invention. As shown in FIG. 1, the serial bus data control device 10, to transfer data through the IEEE 1394 bus 300, for example, between a computer 100 and a node 200 in peripheral equipment, is connected to a local bus (not shown) within the computer 100.

Among a plurality of nodes connected via the IEEE 1394 bus 300 send or receive two or more packets each containing actual data obtained by dividing a series of data into data having a predetermined data length. A packet is composed of a header having a predetermined length containing information about conditions of the sending and receiving nodes, actual data positioned subsequently to the header and a footer also having a predetermined length and being positioned subsequently to the actual data constituting a tail portion of the packet. Each of data size of a header, actual data and footer is a predetermined size, that is, each of the header, actual data and footer is constructed so that the data size of each of the header, actual data and footer is, for example, an integral multiple of a storing unit of the buffer memory included in each node, i.e., of a capacity of each addressed memory location in the buffer.

As shown in FIG. 1, the serial bus data control device 10 of the first embodiment connected to the node 200 is composed of a physical layer control section 11, a link layer control section 12 and a buffer 13 to temporarily store data. The physical layer control section 11, as in the case of the conventional serial bus data control device, is adapted to control receiving and sending of data in accordance with standards designated for the IEEE 1394 bus regarding signal voltages, electrical characteristics of a modem and a network interface card or a like, and physical characteristics of a connector format and numbers of pins or likes. The link layer control section 12 provides procedures for controlling data transferred among nodes. The link layer control section 12, as is well known, is a section adapted to perform preprocessing of storing a plurality of packets fed through the physical layer control section 11 from the IEEE 1394 bus 300 sequentially in the buffer 13 and to divide the received packet including a header, actual data and footer into unit length data each having a predetermined length. The unit length data size matches a storing unit in the buffer 13, i.e., a capacity of an addressed memory location in the buffer 13. The link layer control section 12, also as is well known, is adapted to address of a memory location to store unit length data in the buffer 13. The buffer 13 stores each piece of unit length data in the memory location addressed by the link layer control section 12. The buffer 13, as in the case of the conventional serial bus data control device, temporarily stores unit length data before the unit length data is sent, as parallel data, to the local bus in the computer 100. The link layer control section 12 has an address control circuit 1 as shown in FIG. 1. The address control circuit 1 is a buffer address control means to assign an address of a memory location in the buffer 13 to each unit length data of a header, actual data and a footer contained in each of the two or more received packets.

Figure 2A:
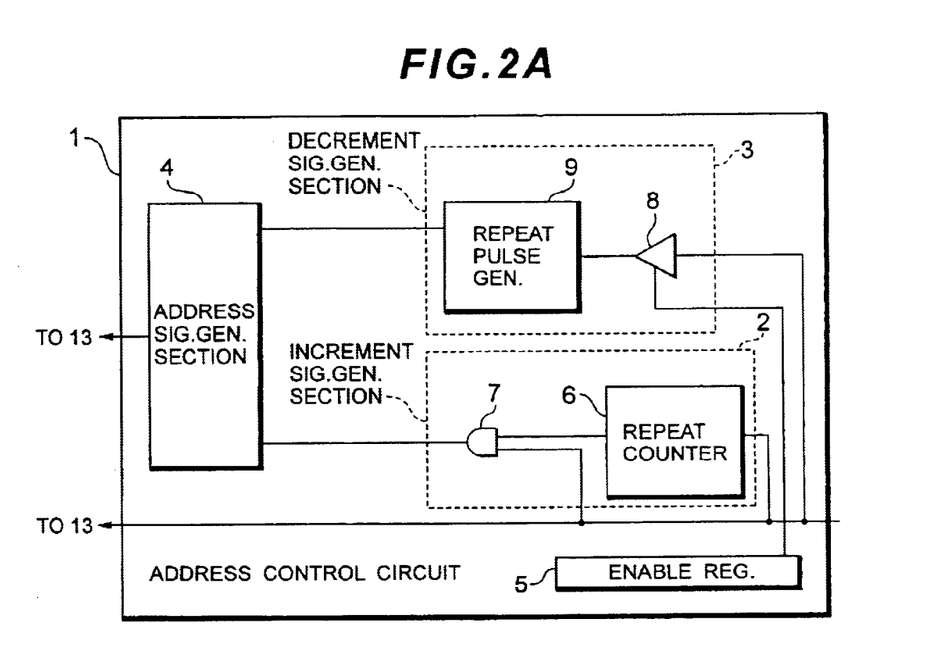
FIG. 2A is a schematic block diagram showing configurations of an address control circuit contained in the serial bus data control device according to the first embodiment of the present invention.

As shown in FIG. 2A, the address control circuit 1 is composed of an address signal generating section 4, an increment signal generating section 2 and a decrement signal generating section 3. The address signal generating section 4 generates an address signal to assign an address of a memory location in the buffer 13 to store each of unit length data contained in each of the received packets and sends out the address signal to the buffer 13. The increment signal generating section 2 generates an increment signal to sequentially add an address indicated by the address signal and feeds the increment signal to the address signal generating section 4. The decrement signal generating section 3 generates a decrement signal to sequentially subtract an address indicated by the address signal and feeds the decrement signal to the address signal generating section 4. The address signal generating section 4, every time it receives the increment signal from the increment signal generating section 2, adds, by one, an address indicated by the address signal to be fed to the buffer 13. The address signal generating section 4, every time it receives the decrement signal from the decrement signal generating section 3, subtracts, by one, an address indicated by the address signal to be fed to the buffer 13. Moreover, the address control circuit 1 is provided with an enable register 5. In the enable register 5 is stored an operation signal to selectively activate either of the increment signal generating section 2 or the decrement signal generating section 3. Sending of the operation signal by the enable register 5 is controlled by a control section (not shown) provided to the link layer control section 12. The enable register 5, when an address of a memory location in the buffer 13 is assigned to a header contained in each of the packets, that is, when addressing to store each of the packets is started, feeds the operation signal to the increment signal generating section 2 to activate the increment signal generating section 2. Furthermore, the enable register 5, when the addressing to store the footer contained in each of the packets is terminated, feeds the operation signal to the decrement signal generating section 3 to activate the decrement signal generating section 3.

Therefore, the increment signal generating section 2 is put in an operation state while addressing to store all data including a header to a footer contained in each of the packets is performed in response to the operation signal fed by the enable register 5, while the decrement signal generating section 3 not receiving the operation signal from the enable register 5 is put in a no operation state. After addressing to store a footer contained in each of the packets has been terminated and before addressing to store a subsequent packet is performed, the decrement signal generating section 3 is put in an operation state in response to the operation signal fed from the enable register 5, while the increment signal generating section 2 not receiving the operation signal is put in a no operation state.

As a control signal fed to the increment signal generating section 2 and the decrement signal generating signal 3 from the enable register 5, a binary signal composed of a value representing "1" or "0" can be used. For example, the "0" signal can be used as the operation signal to activate the increment signal generating section 2, while the "1" signal can be used as the operation signal to activate the decrement signal generating signal 3.

Moreover, the increment signal generating section 2 has a repeat counter 6 to be used for a header and an AND gate 7. Every time addressing to store a header is started, the repeat counter 6 is reset by the control section (not shown) to receive a value which matches the number of unit length data constituting the header. The repeat counter 6, after having received the above value, every time it receives a write signal, does subtraction sequentially until the above value becomes zero. The repeat counter 6, when the counting is terminated, that is, when the addressing to store the header is complete, outputs an increment instruction signal to generate the increment signal to the AND gate 7. The AND gate 7 is an AND circuit having a pair of input terminals and one output terminal and receives a write signal through one of the input terminals and an increment instruction signal to be fed from the repeat counter 6 through the other of the input terminals. The AND gate 7, when receiving the increment instruction signal from the repeat counter 6, outputs the increment signal to the address signal generating section 4.

As a result, when the increment signal generating section 2 is put in an operation state in accordance with the operation signal fed from the enable register 5, since the repeat counter 6 is performing the counting while addressing to store each unit length data of a header is carried out, the increment instruction signal is not outputted from the repeat counter 6 and therefore sending of an increment signal through the AND gate 7 to the address signal generating section 4 is stopped. Moreover, when addressing to store each unit length data contained in actual data and a footer, excluding the header, is performed, since the increment instruction signal is outputted from the repeat counter 6, the increment signal is fed through the AND gate 7 to the address signal generating section 4.

The decrement signal generating section 3 is provided with an inverter 8 and a repeat pulse generator 9 to be used for a footer. A value being a preset value which matches the number of unit length data contained in a footer is set to the repeat pulse generator 9. The inverter 8, when the decrement signal generating section 3 is put in an operation state in accordance with the operation signal fed from the enable register 5, every time it receives a write signal, sends out a decrement instruction signal to generate the decrement signal to the repeat pulse generator 9. The repeat pulse generator 9, when receiving the decrement instruction signal from the inverter 8, sends out the decrement signal to the address signal generating section 4 the number of times being equivalent to the set value. In the address control circuit 1, as described above, since the feeding of the increment signal to the address signal generating section 4 is stopped while addressing to store a header is being performed, the same memory location in the buffer 13 is addressed to store each piece of the unit length data contained in the header. Because of this, when each unit length data contained in the header is stored in the buffer 13, the each unit length data, excluding the data located in a tail portion of the header, is overwritten and erased one after another by the data subsequently being stored.

Since, when the addressing to store the actual data and footer is performed, the increment signal is fed sequentially to the address signal generating section 4, each unit length data contained in the actual data and the footer, after the unit length data contained in the head portion of the actual data has overwritten the unit length data contained in the tail portion of the header already stored in the buffer, is stored sequentially in an memory location addressed in the buffer 13.

Moreover, in the address control circuit 1, as described above, when the addressing to store the data including the header to the footer is performed, since the decrement signal is fed to the address signal generating section 4 the number of times being equivalent to the number of the unit length data contained in the footer, an address obtained by subtraction done until it matches a head address assigned to the footer for which the addressing has been performed is assigned to a header contained in a subsequently receiving packet. Thereafter, since each piece of the unit length data contained in the subsequently coming packets is stored sequentially in the buffer 13, each piece of the unit length data contained in the footer that had been stored is sequentially overwritten and erased. Therefore, each header and each footer contained in two or more packets are overwritten and erased in the buffer 13 and, as a result, each piece of actual data contained in two or more packets is stored in the buffer 13 in a manner that it has an address being directly continued from the previously stored actual data address and in a manner that it has neither header address nor footer address.

As described above, each of a header, actual data and footer contained in a packet has its own data length that is predetermined. For example, in the first embodiment, the header is given 20 bytes, the actual data is given 1000 bytes and the footer is given 4 bytes, each being in accordance with the IEEE 1394 standards. The unit size of data that can be stored in the buffer 13 is one byte, for example.

Next, procedures for operating the serial bus data control device of the first embodiment will be described in order of steps.

Step S1: Every time the link layer control section 12 receives sequentially a packet fed by the IEEE1394 bus 300 through the physical layer control section 11, the increment signal generating section 2 in the address control circuit 1 is put in an operation state in accordance with the operation signal fed from the enable register 5. When the increment signal generating section 2 is put in an operation state, a value "20" obtained by dividing 20 bytes being the data size of the header by one byte being the unit size of data is set to the repeat counter 6 to be used for the header. This value matches the number of unit length data constituting a header contained in each of the received packets. When the value "20" has been set to the repeat counter 6, every time a write signal is inputted, that is, every time addressing is performed to store each piece of the unit length data contained in the header, the repeat counter 6 counts down sequentially until the above value becomes zero.

Figure 2B:
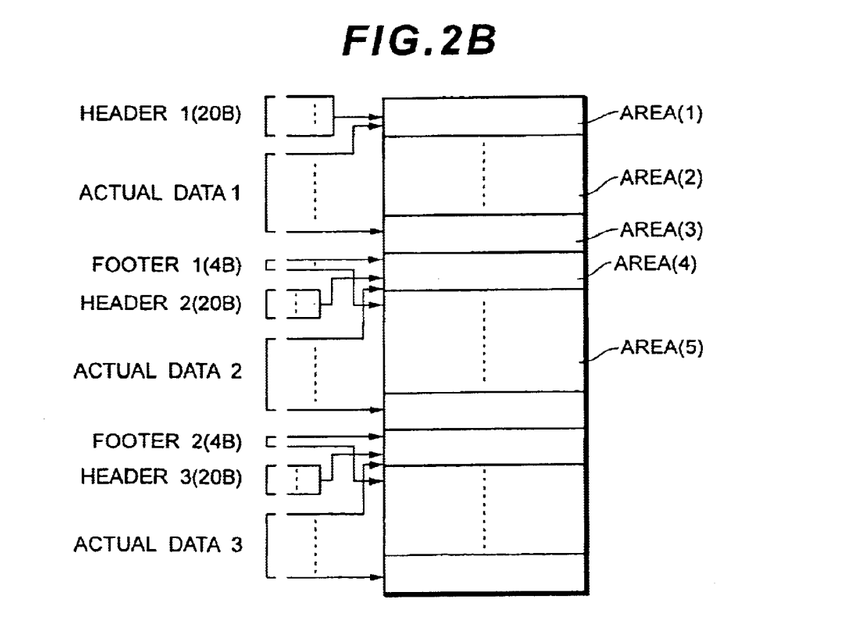
FIG. 2B is a diagram showing arrangements of data in a buffer included in the serial bus data control device according to the first embodiment of the present invention.

Step S2: Since the increment signal generating section 2 stops sending of an increment signal to the address signal generating section 4 until the repeat counter 6 has completed receiving of write signals 20 times, that is, until it has completed the counting-down, the increment signal is not fed to the address signal generating section 4. Therefore, while the feeding of the increment signal to the address signal generating section 4 is stopped, since the address signal generating section 4 stops the addition of the address, the same address is assigned in the buffer 13 to each piece of the unit length data contained in the packet. Then, as shown in FIG. 2B, when the 20 pieces of the unit length data constituting the header, to which the same address has been assigned, are sequentially stored in an area (1) having one byte in the buffer 13, each piece of the unit length data being left after the last one piece of data has been excluded from the 20 pieces of the data is sequentially overwritten and erased.

Step S3: After the repeat counter 6 to be used for the header has completed the counting-down from the value "20" and after the temporary storing of the unit length data positioned in the tail portion of the header in the area (1) has been completed, as shown in FIG. 2B, the unit length data placed in a head position of the actual data contained in the received packet is stored in the area (1). This causes the unit length data positioned in the tail portion of the header already stored in the area (1) to be overwritten by the head data contained in the actual data and to be erased accordingly. Then, when the repeat counter 6 in the increment signal generating section 2 receives a 21st write signal instructing an address to be assigned to a second unit length data contained in the actual data, the increment instruction signal is sent from the counter 6 to the AND gate 7. The AND gate having received the increment instruction signal feeds an increment signal to the address signal generating section 4. The address signal generating section 4, when receiving the increment signal, adds one address indicated by the address signal and feeds the address signal to the buffer 13. This causes the second unit length data contained in the actual data to be stored in a head address of an area (2).

Step S4: Every time each of 22nd to 1024th write signals are fed sequentially to the repeat counter 6, the increment signal is sent from the AND gate 7 to the address signal generating section 4. This causes the added address signal, as in the case of the Step S3, to be sequentially fed from the address signal generating section 4 to the buffer 13. As a result, as shown in FIG. 2B, each piece of the unit length data contained in the actual data is stored, in order starting from the second unit length data, in an area (2) having 998 bytes to an area (3) having one byte in the buffer 13 and a footer being positioned subsequently to the actual data is temporarily and sequentially stored in an area (4) having one byte first and then in a part having up to 3 bytes in an area (5) in the buffer 13.

Step S5: After the packet has been stored in the buffer 13, when the link layer control section 12 receives other packet subsequently to the above packet, in order to overwrite the footer temporarily stored in the area (4) and in the part of the area (5) by the packet to be received subsequently to the previous packet, the operation signal is fed from the enable register 5 to the decrement signal generating section 3. When the decrement signal generating section 3 instead of the increment signal generating section 2 is put in an operation state, as described above, the decrement instruction signal is fed from the inverter 8 to the repeat pulse generator 9, which causes the decrement signal to be outputted, the preset number of times, from the pulse generator 9 to the address signal generating section 4. That is, since a number of the unit length data constituting the 4-byte footer is 4, the decrement signal is outputted four times.

Step S6: The address signal generating section 4, every time it receives the decrement signal, feeds subtracted address signals to the buffer 13. At this point, as shown in FIG. 2B, since the decrement signal is fed to the address signal generating section 4 four times, the address obtained after four times' subtraction, that is, the address of the area (4) in which the head unit length data contained in the footer has been stored is assigned as a head address for subsequently receiving packets. Therefore, as described above, since a header of the subsequently receiving packets are sequentially stored in the area (4) to a part of the area (5), a head to tail portion of each piece of unit length data contained in the footer already stored is overwritten and erased in order.

Thereafter, every time each of other subsequent packets are received, the above Steps S1 to S6 are repeated and, after the same addressing as described above is performed to store each of the subsequent packets, each of the packet is stored in the buffer 13. As a result, each piece of actual data contained in two or more received packets is stored in a memory location having a continued address in the buffer 13.

In the serial bus data control device 10 of the first embodiment, as described above, each of the headers and footers contained in each of the received packets, since the addressing is performed by the address control circuit 1 in the link layer control section 12, is overwritten by the unit length data constituting the actual data to which the continued address has been assigned and is erased. Therefore, since the header and footer are erased by being overwritten, the actual data contained in each of the received packets are arranged in a continuous state in the buffer 13. This makes it possible to efficiently obtain each piece of the actual data needed to reconstruct a series of data contained in two or more received packets.

Second Embodiment

A serial bus data control device of a second embodiment, as in the case of the first embodiment, to transfer data through the IEEE 1394 bus, between a computer and other nodes, is connected to local buses within the computer. The serial bus data control device of the second embodiment has a physical layer control section 11, a link layer control section 12 and a buffer 13 as in the case of the first embodiment shown in FIG. 1. In the second embodiment, the same reference numbers are assigned to parts having the same function as in the first embodiment.

Figure 3A:
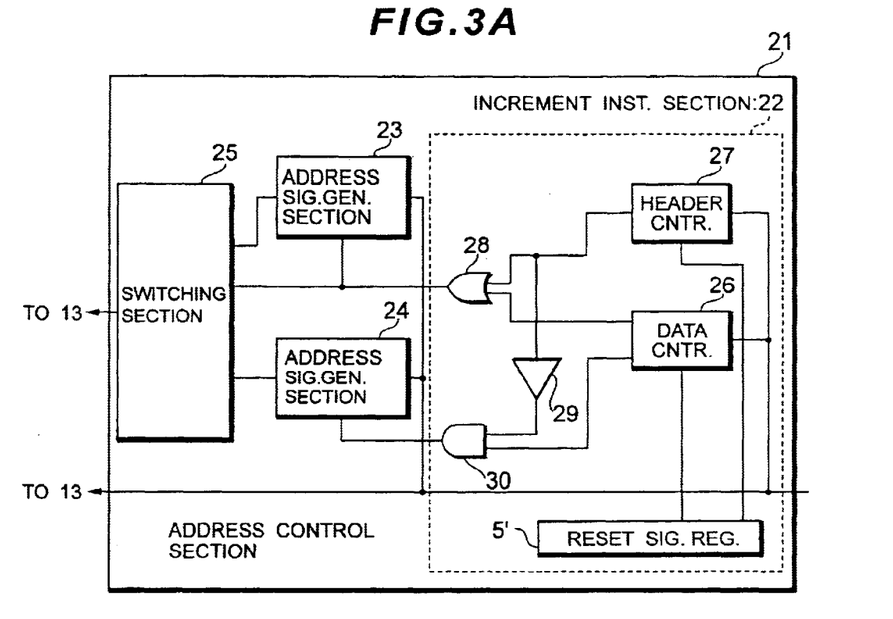
FIG. 3A is a schematic block diagram showing configurations of an address control circuit contained in a serial bus data control device according to a second embodiment of the present invention.
Figure 3B:
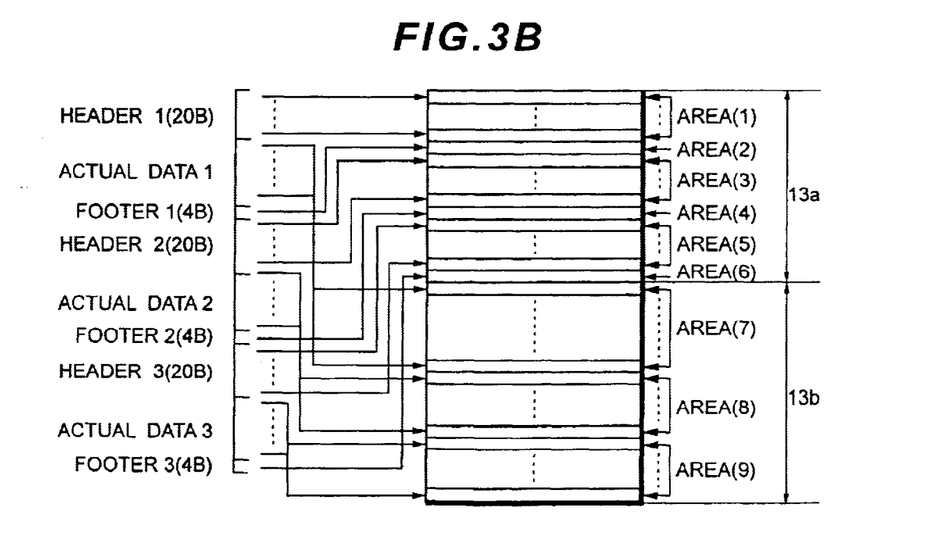
FIG. 3B is a diagram showing arrangements of data in a buffer included in the serial bus data control device according to the second embodiment of the present invention.

As shown in FIG. 3B, an area in the buffer 13 of the second embodiment is partitioned into two areas; one is a first data area 13a to store each of headers and footers contained in a plurality of received packets and the other is a second data area 13b to store each piece of actual data contained in the received packets. As shown in FIG. 3A, the link layer control section 12 of the second embodiment is provided with an address control circuit 21 instead of the address control circuit 1 of the first embodiment. The address control circuit 21 is a buffer address control device to assign an address of a memory location in the buffer 13 to store each piece of unit length data contained in a header, actual data and footer. The address control circuit 21, as shown in FIG. 3A, has an increment instruction section 22, a control data address signal generating section 23, an actual data address signal generating section 24 and a switching section 25. The increment instruction section 22 is a section to generate an increment instruction signal adapted to produce a first increment instruction signal and a second increment instruction signal. The first increment instruction signal is used to add an address so that each piece of unit length data contained in the header and the footer is addressed to store in an memory location of the first data area 13a in the buffer 13. The second increment instruction signal is used to add an address so that each piece of unit length data contained in the actual data is addressed to store an memory location of the second data area 13b in the buffer 13.

The increment instruction section 22, when addressing to store the header and footer, sends out the first increment instruction signal to the control data address signal generating section 23 and the switching section 25. Moreover, the section 22, when addressing to store the actual data, sends out the second increment instruction signal to the actual data address signal generating section 24.

The control data address signal generating section 23 generates an address signal causing each of the header and footer is addressed to store in a memory location of the first data area 13a in the buffer 13. The section 23, after having received a write signal, when receiving the first increment instruction signal from the increment instruction section 22, adds the address indicated by the address signal and feeds the added address signal to the switching section 25. Therefore, the control data address signal generating section 23 can be configured by using an address counter adapted to add an address.

The actual data address generating section 24 generates an address signal causing the actual data is addressed to store in a memory location of the second data area 13b in the buffer 13. The section 24, after having received the second increment instruction signal from the increment instruction section 22, when receiving a write signal, adds an address indicated by the address signal and feeds the added address signal to the switching section 25. Therefore, the actual data address signal generating section 24 can be configured by using the same address counter as can be used for the control data address signal generating section 23.

The switching section 25 sends out each of the added signals fed from the control data address signal generating section 23 and the actual data address generating section 24 selectively to the buffer 13. The switching section 25, when receiving the address signal from the actual data signal generating section 24, sends out the receiving address signal to the buffer 13. The switching section 25, when receiving the first increment instruction signal from the increment instruction section 22, feeds the address signal fed from the control data address signal generating section 23 to the buffer 13. That is, in the example, the switching section 25 selects the address signal to be sent to the buffer 13 in response to the first increment instruction signal.

The increment instruction section 22, as shown in FIG. 3A, is provided with a reset signal register 5', a header counter 27, a data counter 26, an inverter 29, an OR gate 28 and an AND gate 30. In the reset signal register 5' stores a counter signal being a signal indicating a predetermined value. Storing and sending of the counter signal by the reset signal register 5' are controlled by a control section (not shown) provided to the link layer control section 12. The reset signal register 5', when the addressing to store each of the packets is started, feeds a first counter reset signal indicating the number of unit length data contained in the header of the packet to the header counter 27 and, at the same time, feeds a second counter set signal indicating the number of unit length data contained in the header and actual data of the packet to the data counter 26. The header counter 27, receives a write signal and the first counter reset signal, sends out a specified gate signal to the OR gate 28 at the same time sending out the signal to the AND gate 30 through the inverter 29. The header counter 27, when receiving the first counter set signal, starts counting down from the value indicated by the counter set signal every time it receives a write signal. The counter 27, during the counting-down, sends out one of the specified gate signals to each of the OR gate 28 and AND gate 30 sequentially in accordance with the timing of the counting-down. The counter 27, after having completed the counting-down, until it receives a new first counter set signal from the register 5', sends out the other of the specified gate signal being complementary to the above previously-sent gate signal toward each of the OR gate 28 and AND gate 30 every time it receives a write signal. That is, the header counter 27, when addressing to store actual data is started, outputs the above one gate signal toward each of the OR gate 28 and AND gate 30 and then, when addressing to store a header contained in a subsequently receiving other packet is started, outputs the above other gate signal being complementary to the one gate signal toward each of the OR gate 28 and AND gate 30.

The data counter 26, receives a write signal and a second counter set signal from the reset signal register 5', sends out a first gate signal and the second gate signal being complementary to the first gate signal to each of the OR gate 28 and AND gate 30. The data counter 26, when receiving the second counter reset signal, starts counting-down from a value indicated by the counter set signal every time it receives a write signal. The data counter 26, during the counting-down, sends out the first gate signal to the OR gate 28 and, at the same time, feeds the second gate signal to the AND gate 30. Then, the data counter 26, when having completed the counting-down, interchanges the signals to be outputted to each of the OR gate and the AND gate and, as a result, the second gate signal is sent to the OR gate 28 and the first gate signal is sent to the AND gate 30. The counter 26 then outputs each of these gate signals to each of the OR gate 28 and the AND gate 30 respectively until it receives a new counter set signal from the register 5'. That is, the data counter 26, when addressing to store a footer is started, interchanges the gate signals to be outputted to each of the OR gate 28 and the AND gate 30, and then when addressing to store a header contained in a subsequently receiving packet is started, each of the interchanged signals is sent to each of the OR gate 28 and AND gate 30. Therefore, when each of the gate signals from each of the counters 26 and 27 is fed to the OR gate 28 simultaneously, both the gate signal being complementary to the signal fed from the data counter 26 and the gate signal being complementary to the gate signal fed from the header counter 27 are fed to the AND gate 30.

The inverter 29, every time it receives the gate signal from the header counter 27, converts the received gate signal to a gate signal being complementary to the received gate signal and feeds the converted signal to the AND gate.

The OR gate 28, every time it receives the gate signal from the header counter 27 and the gate signal from the data counter 26, computes the OR of the former gate signal with the latter gate signal. The OR gate 28, in accordance with the result of the computation of the OR, outputs a first increment instruction signal to each of the control data address signal generating section 23 and the switching section 25. That is, the OR gate 28, when addressing to store a header and a footer is performed, sequentially outputs the first increment instruction signal.

The AND gate 30, every time it receives a gate signal from the header counter 27 through the inverter 29 and a gate signal from the data counter 26, computes the AND of the former gate signal with the latter gate signal and in accordance with the result of the computation of the AND, outputs a second increment instruction signal to the actual data address signal generating section 24. That is, the AND gate 30, while addressing to store the actual data is performed, sequentially outputs the second increment instruction signal.

In the second embodiment, as in the case of the first embodiment, as data size in accordance with specifications of the IEEE 1394 bus, 20 bytes are assigned to the header, 1000 bytes to the actual data and 4 bytes to the footer. As described in the first embodiment, as a storing unit for the buffer 13, i.e., a size of the unit data, one byte is assigned.

Operational procedures for the serial bus data control device of the second embodiment will be described below according to Steps.

Step S1: Every time the link layer control section 12 receives a plurality of packets from the IEEE 1394 bus through the physical layer control section 11, in the address control circuit 21, a value "20" obtained by dividing a value 20 being a data length of the header by the unit data length is set to the header counter 27 by the reset signal register 5'. Moreover, at this point, a value "1020", which is a result of addition of 20 bytes being the data length of the header to 1000 bytes being a data length of the actual data contained in the packet, obtained by dividing 1020 bytes by one byte being the unit data length, is set to the data counter 26 by the register 5'. The header counter 27 and the data counter 26, every time they receive a write signal, starts counting down from each value set to each of the counters 27 and 26.

Step S2: The header counter 27, during a period before the completion of the counting-down, that is, while the first data area 13a in the buffer 13 is addressed to store the header, sends out the gate signal, for example, a (+) signal to the OR gate and the inverter 29. At this point, the inverter 29, every time it receives the (+) signal from the counter 27, converts the received (+) signal to a (−) signal being complementary to the received (+) signal and feeds the converted (−) signal to the AND gate 30. On the other hand, the data counter 26, while the addressing to store the header is performed, that is, while it receives a write signal twenty times, sends out a (−) signal obtained by the same procedures as described above to the OR gate 28 and feeds a (+) signal to the AND gate 30. Therefore, the OR gate 28, while the addressing to store the header is being performed, every time it receives the (+) signal and the (−) signal from the header counter 27 and the data counter 26, sequentially outputs the first increment instruction signal, in accordance with the result of the computation of the OR, to the control data address generating section 23 and the switching section 25. The control data address generating section 23, every time it receives simultaneously a write signal and the first increment instruction signal sent by the increment instruction section 22, to sequentially address the first data area 13a to store each piece of the unit length data contained in the header, adds an address in order. At this point, an address signal expressing each of the added addresses is sequentially sent out from the control data address signal generating section 23 to the switching section 25. On the other hand, the AND gate 30, while the addressing to store the header is being performed, since it receives the (−) signal and the (+) signal from the counters 26 and 27, in accordance with the result of the computation of the AND, does not output any second increment instruction signal. Moreover, because of this, no address signal is fed from the actual data address signal generating section 24 to the switching section 25. The switching section 25, every time it receives the first increment instruction signal from the OR gate of the increment instruction signal 22 and the address signal from the control data address generating section 23, sequentially sends out the address signal to the buffer 13. As a result, as shown in FIG. 3B, the header having its data length of 20 bytes is stored in an area (1) of the first data area 13a in the buffer 13.

Step S3: After the header has been stored in the buffer 13, the header counter 27, when addressing to store the actual data is performed, that is, when a 21st write signal is fed, sends out the (−) signal instead of the (+) signal to the OR gate 28 and the inverter 29 and while the addressing to store the actual data is being performed, every time it receives a write signal, continues outputting the (−) signal. While the header counter 27 is performing the above operations, the inverter 29, every time it receives the (−) signal from the counter 27, converts the (−) signal to a (+) signal and then feeds the converted (+) signal to the AND gate 30. On the other hand, the data counter 26, while the addressing to store the actual data is being performed, sends out the same gate signal that has been outputted at the time of addressing to store the header to the OR gate 28 and the OR gate 30. Therefore, while the addressing to store the actual data is being performed, the OR gate 28, since it receives the (−) signal and the (+) signal from the counters 27 and 26, in accordance with the result of the computation of the OR, stops outputting the first increment instruction signal to the control data address signal generating section 23 and the switching section 25. Because of this, during this period, no address signal is sent from the control data address signal generating section 23 to the switching section 25. On the other hand, the AND gate 30, while the addressing to store the actual data is being performed, every time it receives the (+) signal and the (−) signal from the counters 27 and 26, in accordance with the result of the computation of the AND, sequentially outputs the second increment instruction signal to the actual data address signal generating section 24. The actual data address signal generating section 24, every time it receives simultaneously a write signal and the second increment instruction signal from the increment instruction section 22, in order to assign the address in the second data area 13b to each piece of the unit length data of the actual data, sequentially adds the address. Then, each address expressing the added address is sequentially sent out from the actual data address signal generating section 24 to the switching section 25. The switching section 25, every time it receives the address signal from the actual data address signal generating section 24, sequentially sends out the address signal to the buffer 13. As a result, as shown in FIG. 3B, the header having its data length of 1000 bytes is sequentially stored in an area (7) of the second data area 13b in the buffer 13.

Step S4: After the actual data has been stored in the buffer 13, the header counter 27, while it is receiving the 1021st to 1024th write signals, that is, while the addressing to store the footer subsequent to the actual data is being performed, continues sending out the (−) signal that has been outputted at the time of the addressing to store the actual data to the OR gate and the inverter 29. The inverter 29, in the same manner as described above, converts the (−) signal to the (+) signal and sends out the converted signal to the AND gate 30. On the other hand, the data counter 26, after having counted down from the "1020", when receiving a 1021st signal, converts a gate signal to be fed to the OR gate 28 from a (−) signal to a (+) signal and from a gate signal to be fed to the AND gate 30 to the (−) signal. The data counter 26, while the addressing to store the footer is being performed, every time it receives a write signal, sends out the converted (+) signal and the (−) signal to each of the OR gate 28 and the AND gate 30 respectively. Therefore, the OR gate 28, while the addressing to store the footer is being performed, every time it receives the (−) signal and the (+) signal from the counters 27 and 26, in accordance with the result of the computation of the OR, sends out the first increment instruction signal to the control data address signal generating section 23 and the switching section 25. The control data address signal generating section 23, every time it receives simultaneously a write signal and the first increment signal fed by the increment instruction generating section 22, in order to assign an address subsequent to the address of the first data area 13a in which the footer has been stored to each piece of the unit length data contained in the footer, sequentially adds the address. At this point, each address signal expressing the added address is sequentially sent out from the control data address signal generating section 23 to the switching section 25. On the other hand, the AND gate 30, while the addressing to store the footer is performed, since it receives the (+) signal and the (−) signal from the counters 27 and 28, in accordance with the computation of the AND, does not output the second increment instruction signal. Because of this, during the period, no address signal is fed from the actual data address signal generating section 24 to the switching section 25. The switching section 25, every time it receives the first increment instruction signal from the OR gate 28 of the increment instruction section 22 and the address signal from the control data address signal generating section 23, sequentially sends out the address signal to the buffer 13. As a result, as shown in FIG. 3B, the footer having a data length of 4 bytes is sequentially stored in an area (2) of the first data area 13a in the buffer 13.

Step S5: After the footer has been stored in the buffer 13, when the link layer control section 12 receives other subsequent packet, as described above, the counter set signal expressing "20" is fed from the reset signal register 5' to the header counter 27 and the counter set signal expressing "1020" is fed to the data counter 26. Then, by the addressing performed in the same manner as above, the header and footer contained in the subsequent packet are stored sequentially in areas (3) and (4) the first data area 13a and the actual data contained in the subsequent packet is stored in an area (8) of the second data area 13b. Thereafter, since the above Step S1 to S5 are repeated every time each of other subsequent packets is received, after the addressing to store contents contained in each packet is performed, these contents are stored in the buffer 13. As a result, each of the headers and footers contained in the received two or more packets is stored in the continued address in the first data area 13a or the actual data contained in each of the packets is contained in the continued address in the second data area 13b.

As described above, the serial bus data control device of the second embodiment, as described above, since the addressing to store two or more received packets is performed by the address control circuit 21 included in the link layer control section 12, each of the header and footer contained in each of the packets is stored in the first data area 13a in the buffer 13 in a manner so as to be arranged in a continuous state and the actual data contained in each of the packets is stored in the second data area 13b also in a manner so as to be arranged in a continuous state.

In the serial bus data control device of the second embodiment, the header and footer and the actual data are stored in different areas in the buffer 13 and a plurality of pieces of the actual data is stored in a manner so as to be arranged in a collective state. This enables each actual data needed to reconstruct its original data to be effectively obtained.

Moreover, since the header and footer are arranged in a collective manner in the buffer 13, when a transmission trouble such as missing of data to be contained in a packet received from other nodes, information contained in the header and footer needed to solve the trouble can be effectively obtained.

Third Embodiment

In a serial bus data control system of a third embodiment, to store each of packets to be received from two or more nodes, for example, N pieces of nodes including ID#1 to ID#N (not shown) in the buffer 13, each piece of the first data area 13a and the second data area 13b is partitioned into divided sections each having a predetermined storage capacity for each node. That is, as shown in FIG. 4B, the first data area 13a in the buffer 13 has divided sections #1 to #N to store a header and footer and the second data area 13b in the buffer 13 has divided sections #1 to #N to store each piece of actual data.

Figure 4A:
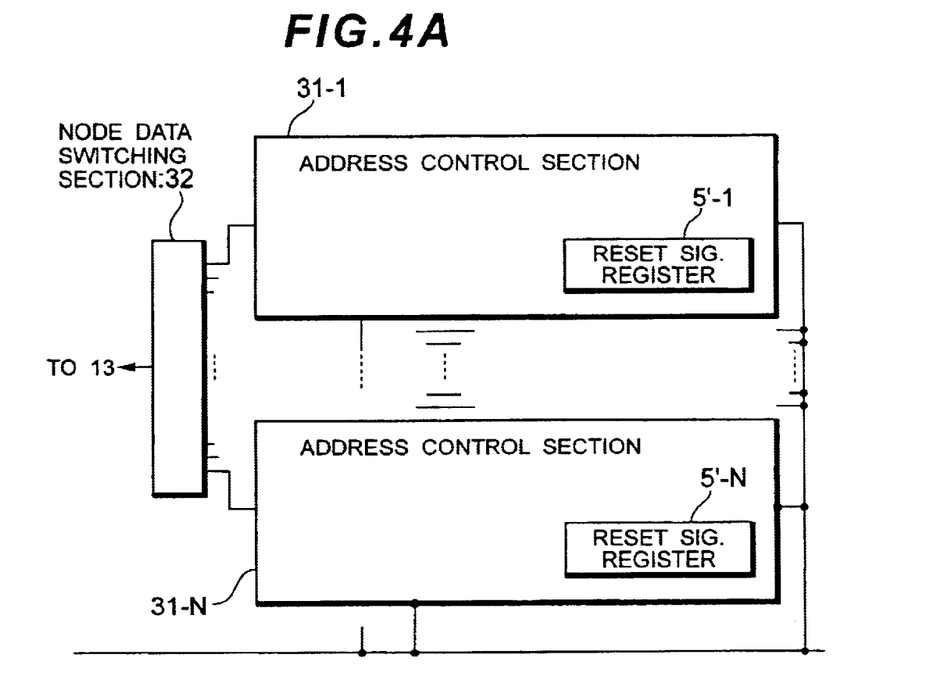
FIG. 4A is a schematic block diagram showing configurations of an address control circuit contained in a serial bus data control device according to a third embodiment of the present invention.
Figure 4B:
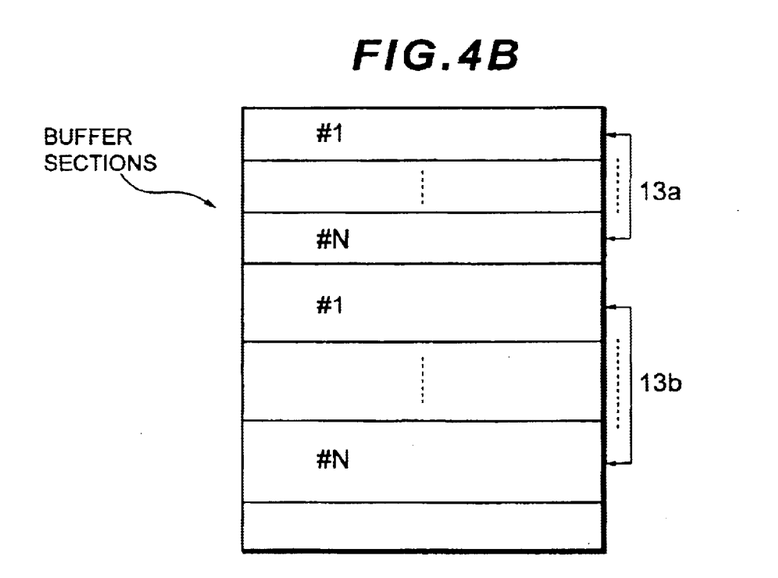
FIG. 4B is a diagram showing arrangements of data in a buffer included in the serial bus data control device according to the third embodiment of the present invention.

The link layer control section 12 of the serial bus data control device of the third embodiment, as shown in FIG. 4A, has address control sections 31-1 to 31-N each corresponding to each of the N-pieces of nodes and a node data switching section 32. The N-pieces of address control circuits (31-1 to 31-N) are basically the same address control circuits as shown in the second embodiment, however, in the third embodiment, an address which corresponds to each of storing areas ID#1 to #N partitioned in advance for each of the nodes is assigned to a packet receiving from each of the N-pieces of nodes (ID#1 to #2). Each of the address control circuits 31 is provided with each of reset signal registers 5' to 5'-N, which is basically the same reset signal register 5' as in the second embodiment. The link layer control section 12, when receiving a packet from each of the nodes described above, using a control section (not shown) of the link layer control section 12, selectively drives each of the address control circuits 31 corresponding to each of the above nodes. The selected address control circuit 31 performs addressing to store each piece of unit length data contained in the packet in the same manner as in the second embodiment and each of the address signals for assigned each node sequentially sends out to the node data switching section 32.

The node data switching section 32 sends out each of the address signals fed from the address control circuit 31 selectively to the buffer 13. The selective sending of the address signal from the node data switching section 32 is controlled by the control section (not shown) of the link layer control section 12.

Operational procedures for the serial bus data control device of the third embodiment will be described below according to Steps.

Step S1: Every time the link layer control section 12 receives a packet from the node ID#1, the address control circuit 31-1 corresponding to the nodes, as in the second embodiment, outputs the counter set signal from the reset signal register 5'-1 to the data counter 26 and the header counter 27 contained in the address control circuit 31-1. At the same time, the node data switching section 32 is given an instruction from the control section that each of the address signals to be fed from the address control circuit 31-1 is sequentially sent to the buffer 13.

Step S2: Then, the address control circuit 31-1, every time it generates address signal for actual data and footer contained in each of the packets in the same manner as in the second embodiment, sends out these signals sequentially to the node data switching section 32. The node data switching section 32, every time it receives the address signal, in accordance with the instruction from the control section, sequentially sends out the address signal to the buffer 13. As a result, as shown in FIG. 4B, each of headers and footers fed from the node ID#1 is stored in areas in the first data area 13a assigned to the header and the footer fed from the node ID#1 and each piece of actual data contained in the packet is sequentially stored in areas in the second data area 13b assigned to the actual data fed from the ID#1.

Step S3: The link layer control section 12, every time it receives a packet from each of the nodes, performs the same procedures as have been done in Step S1 to S2, in a manner so as to correspond to each of the nodes. Therefore, each of the header and the footer contained in each of the packets fed from each of the nodes is stored in the area in the first data area 13a assigned to the header and footer for every node and each piece of actual data contained in each of the packets fed from each of the nodes in the area in the second data area 13b assigned to the actual data for every node.

As described above, in the serial bus data control device of the third embodiment, since the address control circuit 31 operated to correspond to each of the nodes is adapted to perform addressing to store each of two or more packets fed from each of two or more nodes, the header and footer contained in each of the packets are stored in the first data area 13a so as to correspond to each of the nodes and the actual data contained in each of the packets is stored in the second data area 13b so as to correspond to each of the nodes.

Thus, according to the serial bus data control device of the third embodiment, since two or more pieces of the actual data are stored in a manner so as to be collectively arranged, each piece of the actual data needed to reconstitute a series of original data can be effectively obtained. Moreover, since the header and footer are arranged in the buffer 13 in a collective manner, information contained in the header and footer needed to solve a transmission trouble or a like can be effectively obtained.

Furthermore, according to the serial bus data control device of the third embodiment, the header, footer and actual data contained in each of packets fed from each of the two or more nodes are stored so as to correspond to each of the nodes, that is, there is no mixing of the header, footer and actual data among nodes, the packet needed to reconstruct its original data or at the time of the occurrence of the troubles can be easily retrieved for every node.

Fourth Embodiment

Figure 5A:
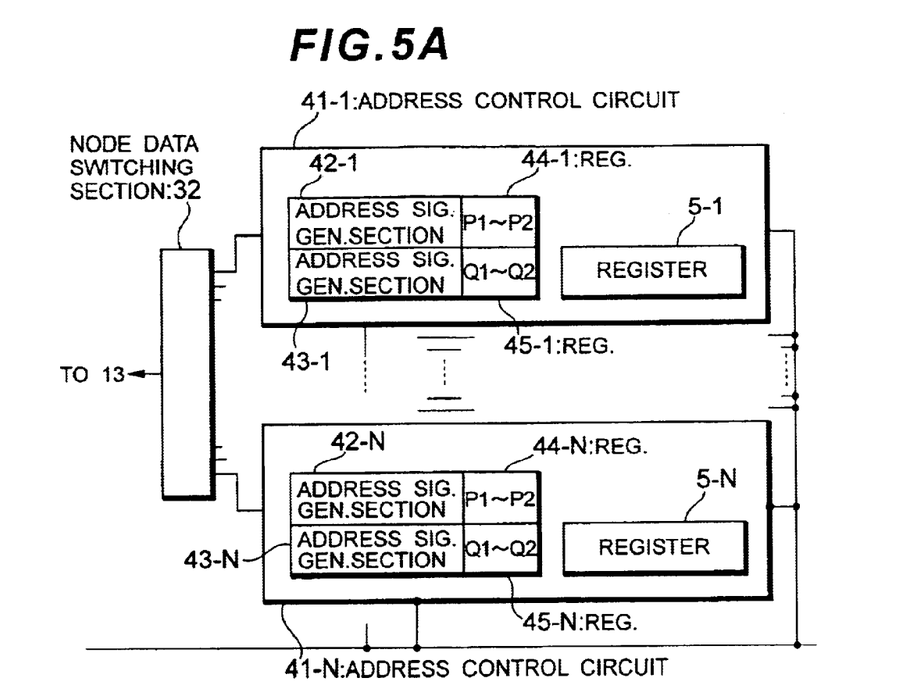
FIG. 5A is a schematic block diagram showing configurations of an address control circuit contained in a serial bus data control device according to a fourth embodiment of the present invention.

In a serial bus data control device of a fourth embodiment, memory sections are partitioned into divided sections in a manner that each divided section in the data areas 13a and 13b in the buffer 13 can be varied depending on data size of a header, actual data and a footer contained in a packet received from each of the two or more nodes so that each of memory locations can be of an appropriate size suitable to the data to be stored. The link layer control section 12 of the serial bus data control device of the fourth embodiment, as shown in FIG. 5A, has address control circuits 41-1 to 41-N to correspond to N-pieces of nodes and a node data switching section 32.

The link layer control section 12, when receiving a packet from each of the nodes, using a control section of the link layer control section 12, selectively drives each of the address circuits 41 corresponding to each of the nodes. The selected address control circuit 41, to perform sequential addressing to store each piece of unit length data contained in the packet, generates an address signal assigned to each of the nodes. Then, as in the third embodiment, each of the address signal is sequentially sent from the address control circuit 41 to the node data switching section 32.

The node data switching section 32 sends out each of the address signals fed from each of the address control circuits 41 selectively to the buffer 13. The selective sending of each of the address signals from the node data switching section 32 is controlled by the control section (not shown) of the link layer control section 12.

Each of the address control circuits 41 is provided with control data address signal generating sections 42 (42-1 to 42-N) and actual data address signal generating sections 43 (43-1 to 43-N), each corresponding to the address control circuit 41. Basic operations of the control data address signal generating section 42 and the actual data address signal generating section 43 are the same as those of the control data address signal generating section 23 and actual data address signal generating section 24 in the third embodiment, however, in the fourth embodiment, each of them is adapted to generate an address to perform addressing to store each of the packets in order to store a header, footer and actual data contained in each of the packets fed from each of the nodes in each of the divided sections as described above.

Moreover, each of the control data address signal generating section 42 has address registers 44 (44-1 to 44-N) to store address signals expressing a starting portion of the control data and an ending portion of the control data and each of the actual data address signal generating section 43 has address registers 45 (45-1 to 45-N) to store an address signal expressing a start portion and an end portion of the actual data. The first address register 44 is adapted to store an address expressing a head portion and a tail portion of an memory area in the first data area 13a assigned to store a header and footer contained in a packet fed from each of nodes ID#1 to ID#N. The second address register 45 is adapted to store an address expressing a head portion and a tail portion of an memory area in the second data area 13b assigned to store an actual data contained in a packet fed from each of nodes ID#1 to ID#N.

Thus, the memory capacity of the divided section assigned to every node is adjusted to be appropriate by both the address signals to be stored in the address registers 44 and 45. In the example, the memory capacity of each of the divided section in the first data area 13a in the buffer 13 corresponds to a total amount of data required to store a header and footer contained in each of the packets fed from each of the nodes, while the memory capacity of the divided section in the second data area 13b corresponds to a total amount of data required to store actual data contained in each of the packets fed from each of the nodes. The storing of both the address signals by the first address register 44 and the second address register 45 is controlled by the control section of the link layer control section 12.

In FIG. 5A, for example, an address signal "P1" stored in the address register 44-1 represents a head address to store a header contained in a first packet fed from the node ID#1, while an address signal "P2" stored in the address register 44-1 represents a tail address to store a footer contained in a last packet fed from the node ID#1. On the other hand, an address signal "Q1" stored in the address register 45-1 represents a head address to store actual data contained in a first packet fed from the node ID#1 and an address signal "Q2" represents a tail address to store actual data contained in a last packet fed from the node ID#1. Each of the addresses indicated by both the address signals can be arbitrarily set depending on the data size of the header, actual data and footer contained in each of the packets. By using, for example, firmware in a computer, the address can be set when a plurality of packets is received from each of the nodes.

In the serial bus data control device of the fourth embodiment, when the link layer control section 12 starts receiving two or more packets from the node ID#1, by the control of the link layer control section 12, both the addresses indicating the head address and the tail address, which is set depending on the data size of each of the header and the footer, in the memory area assigned to store the header and footer contained in the packet fed from the node ID#1 are stored in the address register 44-1, while both the addresses, set depending on the size of the actual data contained in the packet fed from the node ID#1, indicating the head and tail addresses to store the actual data are stored in the address register 45-1.

Then, the control data address signal generating section 42-1, when the head address is assigned to store the head contained in the first packet fed from the node ID#1, sends out the address signal, which indicates the head address and is one of address signals stored in the address register 44-1, to the node data switching section 32, while the control data address signal generating section 43-1, when the head address is assigned to store the actual data contained in the first packet fed from the node ID#1, sends out the address signal, which indicates the head address and is one of address signals stored in the address register 45-1, to the node data switching section 32. The node data switching section 32, as in the third embodiment, every time it receives each of the above address signals, sequentially sends out each of the received address signals to the buffer 13.

From then on, every time the addressing to store each of the contents contained in the packets fed from the node ID#1 is performed, the address signal representing addresses in the memory area assigned to the header, footer and actual data contained in each of the packets fed from the node ID#1, in the same manner as described above, is sequentially fed from the address control circuit 41-1 through the node data switching section 32 to the buffer 13.

The actual data address signal generating section 43-1, the tail address is assigned to the actual data contained in the last packet fed from the node ID#1, sends out the address signal expressing the last tail address and the other of the address signals stored in the actual address register 45-1 to the node data switching section 32. The actual data address signal generating section 42-1, the tail address is assigned to the footer positioned subsequently to the actual data contained in the last packet fed from the node ID#1, sends out the address signal expressing the last tail address and the other of the address signals stored in the actual address register 45-1 to the node data switching section 32. Each of the address signals fed from the address signal generating sections 42-1 and 43-1, in the same manner as described above, is sent from the node data switching section 32 to the buffer 13. As a result, as shown in FIG. 5B, the header and footer contained in each of the packets fed from the node ID# are stored in the header/footer storing area specified by the address signals fed from the address register 44-1, while the actual data contained in each of the packets fed from the node ID# is stored in the actual data storing area specified by the address signals fed from the address register 45-1.

From then on, the link layer control section 12, every time it receives a plurality of packets from each of the nodes, repeats the same processing as described above.

Figure 5B:
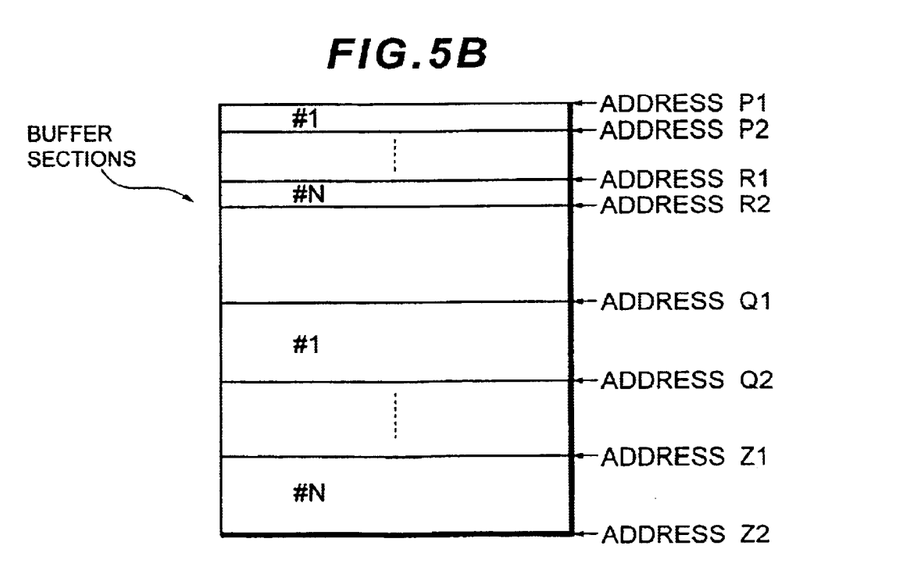
FIG. 5B is a diagram showing arrangements of data in a buffer included in the serial bus data control device according to the fourth embodiment of the present invention.

Thus, as shown in FIG. 5B, the header and footer contained in each of the packets fed from each of the nodes ID#1 to ID#N are stored in the header/footer storing areas whose memory capacity has been adjusted depending on the data size of the header and footer and the actual data contained in each of the packets fed from each of the nodes ID#1 to ID#N is stored in the actual data storing area whose memory capacity has been adjusted depending on data size of the actual data.

According to the serial bus data control device of the fourth embodiment, as described above, since each of the address control circuits 41 adapted to correspond to each of the two or more nodes performs addressing to store each of the packets fed from each of the nodes, a header and footer contained in each of the packets are stored in the first data area 13a which has been partitioned appropriately depending on a data size of the header to be stored and the footer and actual data contained in each of the packets is stored in the second data area 13b which has been partitioned appropriately depending on an data size of the actual data to be stored.

Therefore, in the serial bus data control device of the fourth embodiment, since each piece of actual data is arranged in a collective manner in the buffer so as to correspond to each node, it is possible to efficiently reconstruct a series of original data. Moreover, since headers and footers are arranged collectively in the buffer so as to correspond to each node, measures to solve transmission troubles or a like can be taken easily. Since a header, footer and actual data contained in each of the packets fed from each of the nodes are stored in divided sections whose memory capacity has been appropriately partitioned depending on data amounts of each of the header, footer and actual data to be stored so as to correspond to each of the nodes, it is possible to use the buffer memory efficiently without causing useless unused memory areas in the buffer 13.

As described above, according to the present invention, in the serial bus data control device, since the address control circuit is adapted to assign a continued address in the storing area to actual data contained in each of packets received through the serial bus, each piece of the actual data is arranged in the memory area in a continuous manner. Therefore, since each piece of the actual data is collectively stored in the buffer, each piece of actual data needed to reconstruct a serial original data contained in two or more received packets can be efficiently obtained.

It is apparent that the present invention is not limited to the above embodiments but may be changed and modified without departing from the scope and spirit of the invention.

What is claimed is:

1. A serial bus data control device for use with communication equipment to receive packets sent through a serial bus and each having a header, actual data positioned subsequently to said header and a footer positioned subsequently to said actual data, comprising:

a preprocessing section to recognize packets received through said serial bus and to divide said header, actual data and footer contained in each of said recognized packets into pieces of unit length data each having a predetermined data length; and a storing section, coupled to said preprocessing section, to temporarily store said headers, actual data, and footers contained in packets recognized by said preprocessing section, said headers, actual data, and footers of a plurality of packets being stored in said storing section simultaneously;

wherein said preprocessing section is provided with an address control circuit to assign addressing in said storing section for said storing headings, actual data, and footer footers, wherein said storage section is partitioned into a first data area to store the headers and footers of received packets and a second data area to store the actual data in the received packets, aid wherein the first data area has a first range of consecutive addresses beginning with a first start address for simultaneously storing said headers and footers of more than one packet, and a second range of consecutive time addresses beginning with a second start address for simultaneously storing said actual data of more than one packet simultaneously.

2. The serial bus data control device according to claim 1, wherein said header contained in each of said packets has information about nodes on a sender side and on a receiver side and wherein each of said header, said actual data and said footer has an integral number of bytes.

3. A serial bus data control device for use with communication equipment to receive two or more packets sent through a serial bus and each being composed of a header, actual data positioned subsequently to said header and a footer positioned subsequently to said actual data, comprising:

a preprocessing section to recognize each of said two or more packets received through said serial bus and to divide at least said actual data contained in each of said recognized packets into two or more pieces of unit length data each having a predetermined data length; and a storing section, coupled to said preprocessing section, to temporarily store at least said actual data contained in each of said packets recognized by said preprocessing section;

wherein said preprocessing section is provided with an address control circuit to assign a continued address of said storing section, at least, to said unit length data constituting said actual data contained in each of said recognized packets composed of said header, said actual data and said footer, and wherein said address control circuit performs addressing to store said header and said footer, in addition to addressing to store said actual data, and comprises an address signal generating section to generate an address signal used to assign an address of said storing section to said header, said actual data and said footer; an increment signal generating section, coupled to said address signal generating section, to generate an increment signal used to sequentially add said address signal generated by said address signal generating section and to feed said generated increment signal to said address signal generating section; and a decrement signal generating section, coupled to said address generating section, to generate a decrement signal used to sequentially subtract said address signal generated by said address signal generating section and to feed said generated decrement signal to said address signal generating section, and wherein, when an address is assigned to said header, a supply of said increment signal generated by said increment signal generating section and said decrement signal generated by said decrement signal generating section to said address signal generating section is stopped and, when an address is assigned to said unit length data constituting said actual data, said increment signal is fed from said increment signal generating section sequentially to add said address signal and, when an address is assigned to said footer, after said increment signal has been fed from said increment signal generating section to add said address signal for temporarily storing said footer in said storing section, said decrement signal generated by said decrement signal generating section is fed to said address signal generating section to subtract said address signal to be given to said footer for causing said footer to be overwritten by a header contained in a subsequently receiving packet.

4. The serial bus data control device according to claim 3, wherein said header is composed of two or more pieces of unit length data each having a unit length and wherein, when an address is assigned to each of said unit length data contained in said header, by stopping a supply of said increment signal and said decrement signal to said address signal generating section to sequentially overwrite said unit length data contained in said header, the same address is assigned to said unit length data contained in said header.

5. The serial bus data control device according to claim 3, wherein, when an address is assigned to said unit length data contained in said actual data, a head address signal used to assign an address to unit length data placed in a head position in said two or more pieces of unit length data contained in said actual data matches an address signal for said header.

6. The serial bus data control device according to claim 3, wherein said footer is composed of two or more pieces of unit length data each having a unit length and wherein, after addressing has been performed by said address signal generating section to store each piece of said unit length data contained in said footer in said storing section, subtraction is done to match an address of said unit length data placed in a head position in said footer with that of a unit length data placed in a head position in a header contained in a subsequently receiving packet for causing said footer to be overwritten by said subsequent packet.

7. A serial bus data control device for use with communication equipment to receive two or more packets sent through a serial bus and each being composed of a header, actual data positioned subsequently to said header and a footer positioned subsequently to said actual data, comprising:

a preprocessing section to recognize each of said two or more packets received through said serial bus and to divide at least said actual data contained in each of said recognized packets into two or more pieces of unit length data each having a predetermined data length; and a storing section, coupled to said preprocessing section, to temporarily store at least said actual data contained in each of said packets recognized by said preprocessing section;

wherein said preprocessing section is provided with an address control circuit to assign a continued address of said storing section, at least, to said unit length data constituting said actual data contained in each of said recognized packets composed of said header, said actual data and said footer, wherein said storing section has a first data area to store said headers and footers contained in two or more packets in a manner so as to be arranged in a continuous state and a second data area to store two or more pieces of actual data contained in said two or more packets in a manner so as to be arranged in a continuous state, wherein said address control circuit performs addressing to store said header and said footer in addition to said addressing to store said actual data, and comprises a first address signal generating section to generate an address signal for assigning an address of said first data area to said header and said footer; a second address signal generating section to generate an address signal for assigning an address of said second data area to said unit length data contained in said actual data; an increment instruction signal generating section to generate a first increment instruction signal for sequentially adding said address signals produced by said first address signal generating section and a second increment instruction signal for sequentially adding said address signals produced by said second address signal generating section and to selectively feed said first and second increment instruction signals to said first and second address signal generating sections; and a switching section to operate in accordance with said first and second increment instruction signals to feed selectively said address signals produced by said first and second address generating sections to said storing section, and wherein said increment instruction signal generating section, when an address is assigned to said header and said footer, sends out said first increment instruction signal to said first address generating section and, when an address is assigned to said actual data, sends out said second increment instruction signal to said second address generating section.

8. The serial bus data control device according to claim 7, wherein said switching section connects said first and second address signal generating sections selectively to said storing section in accordance with said first increment instruction signal fed from said increment instruction signal generating section to feed said address signal to said storing section.

9. The serial bus data control section according to claim 7, wherein said increment instruction signal generating section comprises:

a register to supply a signal expressing a value of said header, said actual data and said footer;

first and second counters to count said value expressed by said signal fed from said register;

a first gate operated in accordance with an output signal from each of said counters to send out said first increment instruction signal at the time of addressing to store said header and said footer; and a second gate operated in accordance with an output signal from each of said counters to send out said second increment instruction signal at the time of addressing to store said actual data.

10. The serial bus data control device according to claim 9, wherein said second gate, when said first gate receives simultaneously a gate signal from said first counter and a gate signal from said second counter, receives simultaneously a first signal that is complementary to said gate signal from said first counter and a second signal that is complementary to said gate signal from said second counter.

11. The serial bus data control device according to claim 7, wherein each of said areas in said storing section is partitioned to divided sections to correspond to each of said nodes so that each of the packets received from two or more nodes through said serial bus is stored.

12. The serial bus data control device according to claim 11, wherein each of said first and second data areas is composed of a single area.

13. The serial bus data control device according to claim 11, wherein said preprocessing section is provided with a plurality of address control circuits, each corresponding to one of said nodes, and further comprises a node switching section to selectively supply an address signal fed from said address control circuits to said storing section.

14. The serial bus data control section according to claim 13, wherein each of said divided sections in said both data areas of said storing section has a storage capacity that is variable.

15. The serial bus data control section according to claim 14, wherein said storing capacity of each of said divided sections in said both data areas is able to be adjusted depending on a total amount of data of said header and said footer contained in each of two or more packets sent from each of said nodes and on a total amount of data of said actual data contained in each of two or more packets sent from each of said nodes.

16. The serial bus data control section according to claim 14, wherein each of said address control circuits comprises a first address register and a second address register to store an address showing a head portion of each of said divided sections and an address showing a tail portion of each of said divided sections for specifying each of said divided sections in each of said first and second data areas, and wherein both said addresses assigned to said header and said footer to store in said divided section are stored in said first address register and both said addresses assigned to said actual data to store in said divided section are stored in said second address register.

17. A serial data control method for receiving packets sent through a serial bus, each packet having a header, a footer, and actual data, comprising the steps of:

dividing received packets into actual data portions and header and footer portions;

storing the actual data portions in a first region of a buffer memory and storing the header and footer portions in a second region of the buffer memory, the first region having a first address space defined by a plurality of consecutive addresses for storing the header and footer portions of more than one packet simultaneously and the second region having a second address space that does not overlap the first address space and that is defined by a plurality of consecutive addresses for storing the actual data portions of more than one packet simultaneously.

18. The serial data control method of claim 17, wherein the storing step comprises generating control data address signals and generating actual data address signals.

19. The serial data control method of claim 18, wherein the storing step further comprises selectively switching between the control data address signals and the actual data address signals, and conveying the selected address signals to the buffer memory.

20. The serial data control method of claim 17, wherein the first region of the buffer memory stores actual data portions of a plurality of packets simultaneously, and the second region of the buffer memory stores header and footer portions of said plurality of packets simultaneously.

21. A serial data control method for receiving packets sent through a serial bus, each packet having a header, a footer, and actual data, comprising the steps of:
(a) diving the header, actual data, and footer in the packets received through the serial bus into pieces of unit length data each having a predetermined length; and
(b) temporarily storing the headers, actual data, and footers in a storing section,
wherein step (b) is conducted such that unit length pieces of header data of a given packet are stored at least temporarily in the storing section and then overwritten by the actual data of the given packet.

22. The serial data control method of claim 21, wherein step (b) is further conducted such that the unit length pieces of header data of the given packet are stored at the same address in the storing section, and storage of the actual data of the given packet begins at said same address, so as to overwrite the last unit length piece of header data of the given packet.

23. The serial data control method of claim 21, wherein step (b) is further conducted such that unit length pieces of footer data of the given packet are stored at least temporarily in said storing section, and then overwritten by the header of a packet immediately following the given packet.

24. The serial data control method of claim 21, wherein step (b) is further conducted such that unit length pieces of the actual data of the given packet are stored at consecutive addresses in the storing section, the number of consecutive addresses corresponding to the number of unit length pieces of actual data in the given packet.

25. The serial data control method of claim 21, wherein the unit length pieces are one byte long.

26. The serial data control method of claim 21, wherein the header in each of the packets has information about nodes on a sender side and on a receiver side.

27. A serial bus data control device for use with communication equipment to receive packets sent through a serial bus and each having a header, actual data positioned subsequently to said header, and a footer positioned subsequently to said actual data, comprising:
a preprocessing section to recognize packets received through the serial bus and to divide the header, actual data, and footer in each of the recognized packets into pieces of unit length data each having a predetermined data length; and
a storing section, coupled to the preprocessing section, to temporarily store the headers, actual data, and footers in the packets recognized by the preprocessing section,
wherein the preprocessing section is provided with an address control circuit to assign addresses such that unit length pieces of header data of a given packet are stored at least temporarily in the storing section and then overwritten by the actual data of the given packet.

28. The serial bus data control device according to claim 27, wherein the unit length pieces of header data of the given packet are stored at the same address in the storing section, and storage of the actual data of the given packet begins at said same address, so as to overwrite the last unit length piece of header data of the given packet.

29. The serial bus data control device according to claim 27, wherein unit length pieces of footer data of the given packet are stored at least temporarily in said storing section, and then overwritten y the header of a packet immediately following the given packet.

30. The serial bus data control device according to claim 27, wherein unit length pieces of the actual data of the given packet are stored at consecutive addresses in the storing section, the number of consecutive addresses corresponding to the number of unit length pieces of actual data in the given packet.

31. The serial bus data control device according to claim 27, wherein the unit length pieces are one byte long.

32. The serial bus data control device according to claim 27, wherein the header in each of the packets has information about nodes on a sender side and on a receiver side.

\* \* \* \* \*